(12) United States Patent
Wang et al.

(10) Patent No.: US 7,225,118 B2
(45) Date of Patent: May 29, 2007

(54) GLOBAL DATA PLACEMENT

(75) Inventors: Qian Wang, State College, PA (US);
Arif Merchant, Los Altos, CA (US);
Nina Mishra, San Ramon, CA (US);
Mahesh Kallahalla, Palo Alto, CA
(US); Ram Swaminathan, Cupertino,
CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 10/284,098

(22) Filed: Oct. 31, 2002

(65) Prior Publication Data

US 2004/0088147 A1 May 6, 2004

(51) Int. Cl.
*G06F 9/45* (2006.01)

(52) U.S. Cl. .................................... 703/22

(58) Field of Classification Search .............. 703/21, 703/22, 2; 718/102; 702/186
See application file for complete search history.

(56) References Cited

U.S. PATENT DOCUMENTS

| | | | | |
|---|---|---|---|---|
| 5,440,719 A | * | 8/1995 | Hanes et al. ................ 703/21 |
| 5,854,754 A | * | 12/1998 | Cabrera et al. ............. 703/2 |
| 5,960,181 A | * | 9/1999 | Sanadidi et al. ............ 703/21 |
| 6,564,174 B1 | * | 5/2003 | Ding et al. ................ 702/186 |
| 6,907,395 B1 | * | 6/2005 | Hunt et al. ................. 703/21 |

* cited by examiner

*Primary Examiner*—Albert W. Paladini

(57) ABSTRACT

A method of global data placement. The method includes assigning one or more workloads to one or more compute servers such that each workload flows to one compute server, assigning the data chunks that the workloads accesses to one or more storage servers, and determining how the workloads access the data.

28 Claims, 6 Drawing Sheets

GLOBAL DATA PLACEMENT

FIELD OF THE INVENTION

The invention is generally related to networks or systems. More particularly, the invention is related to allocating resources in a network or system.

BACKGROUND

More and more, the emerging model of enterprise computing is one where compute and storage resources are distributed globally. To derive most benefit from the investment in the infrastructure, resources are preferred to be consolidated into one pool. Users may then be able to just run an application on the pool, without needing to consider how and where the resources were actually derived from. However, to make best use of the available resources, the system should be able to make efficient allocation decisions, such as deciding where an application is run, where some database is stored, or how much bandwidth is allocated on some network for one application.

Users may generate workloads where each workload is an application with computational and storage requirements. Each of these workloads may be assigned to a compute server to perform the required computations. The data that the workloads access may also be assigned storage servers from which the compute server accesses the data.

However, costs are incurred in such environments. For instance, the cost of running a workload on a server could be measured in the amount of time the application used the server, the cost of locating a piece of data on a storage server could be measured in the amount of storage space used, or the cost of using a network link could be measured in the amount of bandwidth that was consumed. The problem then becomes matching workloads with the appropriate resources to minimize costs.

One approach to allocating resources is the storage configuration approach, as described by Alvarez et al., "Minerva: An Automated Resource Provisioning Tool for Large-Scale Storage Systems," *ACM Transactions on Computer Systems,* 2001 and Anderson et al., "Hippodrome: Running Circles Around the Storage Administrator," *Conference on File and Storage Technologies,* 2002. The storage configuration approach involves placing data onto storage devices subject to capacity and utilization constraints, while minimizing the cost of the storage devices.

However, the storage configuration approach assumes computation to be local to the storage and is separately assigned. In particular, there is no network latency between computation and storage. Thus, the storage configuration approach is not suitable when modeling behavior of a system whose resources are distributed.

There have been other works that attempt to solve variants of the data placement problems such as the file assignment approach, web object placement approach, and the web cache placement approach. However, these approaches had many deficiencies such as inability to explore load-balancing issues, computational inefficiency, lack of provable quality solution and/or performance, and the like.

SUMMARY OF THE INVENTION

According to an embodiment of the present invention, a method of global data placement may include assigning one or more workloads to one or more compute servers and controlling flow of the one or more workloads wherein each workload flows to one compute server.

According to another embodiment of the present invention, a method of global data placement includes assigning one or more workloads; assigning one or more workload nodes such that each of one or more workloads is connected to at least one of the one or more workload nodes; assigning one or more compute server nodes connected to the one or more workload nodes such that a flow from each workload node passes through an edge to a single compute server node, assigning one or more storage server nodes such that each compute server node is connected to at least one of the one or more storage server nodes; and assigning one or more store nodes such that each of one or more storage server nodes is connected to at least one of the one or more store nodes.

According to yet another embodiment of the present invention, a method of allocating resources in a network includes modeling a source and a sink for each data stream of the network; modeling intermediate nodes including one or more workload nodes, one or more compute server nodes, and one or more storage server nodes such at each workload node is connected to only one of the one or more compute server nodes and such that each compute server node is connected to at least one of the one or more storage server nodes; connecting the source for each data stream to at least one of the one or more workload nodes; and connecting the source for each data stream to at least one of the one or more storage server nodes.

BRIEF DESCRIPTION OF THE DRAWING

Features of the present invention will become known from the following description with reference to the drawings, in which.

DETAILED DESCRIPTION

Figure 1:
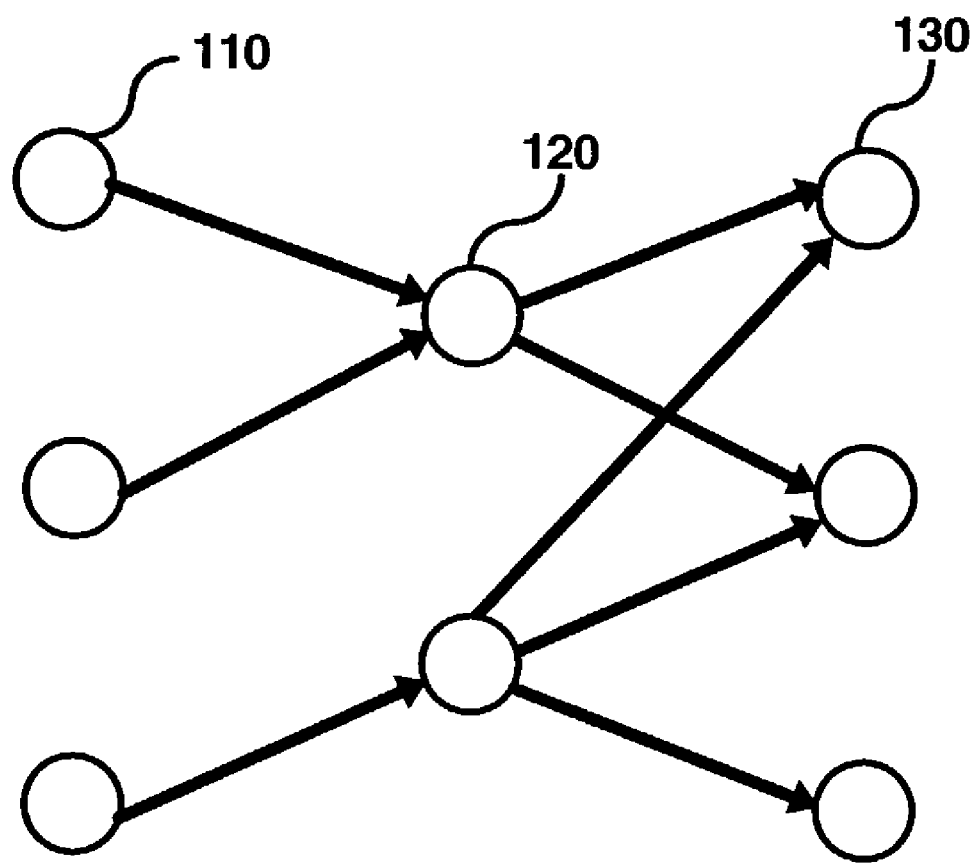
FIG. 1 is a block diagram of an exemplary system where multi-commodity flow modeling may be used according to an embodiment of the present invention.

For simplicity and illustrative purposes, the principles of the present invention are described by referring mainly to exemplary embodiments thereof. In the following description, numerous specific details are set forth in order to provide a thorough understanding of the present invention. However, the present invention may be practiced without limitation to these specific details. In other instances, well known methods and structure have not been described in detail so as not to unnecessarily obscure the present invention.

In an embodiment of the present invention, the data placement problem is modeled as a mixed-integer minimum-cost multi-commodity flow problem. In this approach, the problem of allocating resources in a global system is modeled as a multi-commodity network flow problem, which is then solved. The flow of the different commodities on the network indicates how different resources are allocated.

The limited resources in the system impose natural constraints on the solution. For instance, the computation resources on the server are bounded, the storage space on storage servers is bounded, and the link bandwidth is also bounded.

Thus, in an embodiment of the present invention under this modeling approach, the inputs to the model are (a) stores, which are data chunks characterized by size; (b) workloads, characterized by a server requirement such as computation and memory; (c) compute servers providing computation and memory resources; (d) storage servers providing storage resources; and (e) an arbitrary network connecting compute servers and storage servers. Note that a particular store may be replicated on multiple storage servers, and the number of replicas of every store (each of which may be different), may be specified as part of the input.

The solution to the global data problem is a mapping of workloads to storage servers, stores to storage servers, and paths for different workloads to access their data, while obeying constraints such as computation, memory, and bandwidth constraints of the network and the servers. The output is a solution that minimizes aggregate costs. As noted previously, costs include compute cost, storage cost, transmission cost and the like. Costs may also be defined so that finding shortest path, minimizing resource usage, maximizing performance.

Overview of GDP as a Multi-commodity Flow Problem

The multi-commodity network flow problem may be viewed as a network flow formulation with multiple commodities. On each edge (a connection between any two nodes) of the graph, a flow may be defined. In other words, a flow is a value for each commodity on each edge of the graph. Each commodity has its own source and sink and honors its own flow conservation constraints. In other words, at each intermediate node (other than a source or a sink), the incoming flow equals the outgoing flow. Examples of intermediate nodes include the workload nodes, compute server nodes and storage server nodes. The flow conservation may be described by the following equation:

$$\sum_j x_{ij}^k - \sum_j x_{ji}^k = b_i^k \qquad (1)$$

where $$\sum_j x_{ij}^k$$

represents the sum of outgoing flow of commodity k from node i, $$\sum_j x_{ji}^k$$

represents the sum of incoming flow of commodity k into node i, and $b_i^k$ represents the net flow of commodity k generated by node i. For the intermediate nodes, the net flow $b_i^k$ generated is zero indicating that the sum of the outgoing flow $$\sum_j x_{ij}^k$$

is equivalent to the sum of incoming flow $$\sum_j x_{ji}^k.$$

Figure 2:
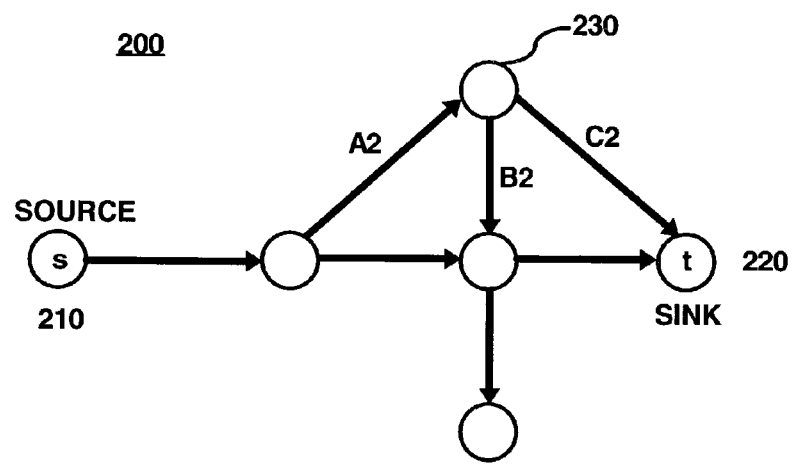
FIG. 2 is a block diagram of an exemplary graph illustrating the concept of flow conservation.

FIG. 2 is a block diagram of an exemplary graph 200 illustrating the concept of flow conservation described above. The graph 200 includes a source 210 (denoted by "s"), sink 220 (denoted by "t"), and intermediate nodes as exemplified by node 230. The flow conservation described by equation (1) simply indicates that flow on edge A2 into the node 230 equals the sum of flow on edges B2 and C2 out of the node 230.

In the multi-commodity flow modeling, each edge may have a capacity constraint. The edge constraint may generally be described as follows:

$$\sum_k w_{ij}^k x_{ij}^k \le U_{ij} \qquad (2)$$

where $w_{ij}^k$ represents a weight of the commodity k flowing through edge from node i to node j (or edge ij), $x_{ij}^k$ represents the amount flow of commodity k through the edge ij, and $U_{ij}$ represents the upper limit on capacity of the same edge. The weight represents the amount of capacity needed for each unit of the commodity. Equation (2) states that the sum of weighted commodity flows may not exceed the capacity of the edge.

In addition to edge capacity constraints, each commodity may have its own individual capacity constraint. For example, in FIG. 2, it may be that only a certain range of commodity from the source node 210 may flow through edge A1. Such individual constraint may be described by the following equation:

$$l_{ij}^k \le x_{ij}^k \le u_{ij}^k \qquad (3)$$

where $l_{ij}^k$ and $u_{ij}^k$ represent lower and upper bounds on the capacity of the commodity k through the edge ij.

The goal of solving the multi-commodity flow model then becomes an effort to minimize cost. This may be expressed by the following equation:

$$\min\left(\sum_k \sum_{ij} C_{ij}^k x_{ij}^k\right) \quad (4)$$

where $C_{ij}^k$ represents a cost of flow of commodity k between nodes i and j. The minimizing cost as shown in equation (4) is subject to the constraints defined by equations (1), (2), and (3).

An approach to a global data placement ("GDP") problem under the multi-commodity flow model taken by an embodiment of the present invention may generally be described as follows: constructing a network and commodities corresponding to the problem instance, solving it using multi-commodity flow algorithms, and using the way that commodities flow in the constructed network to determine assignment of workloads to computation servers, determine the assignment of data replicas to storage servers, and determine the data access paths for the workloads.

Figure 3:
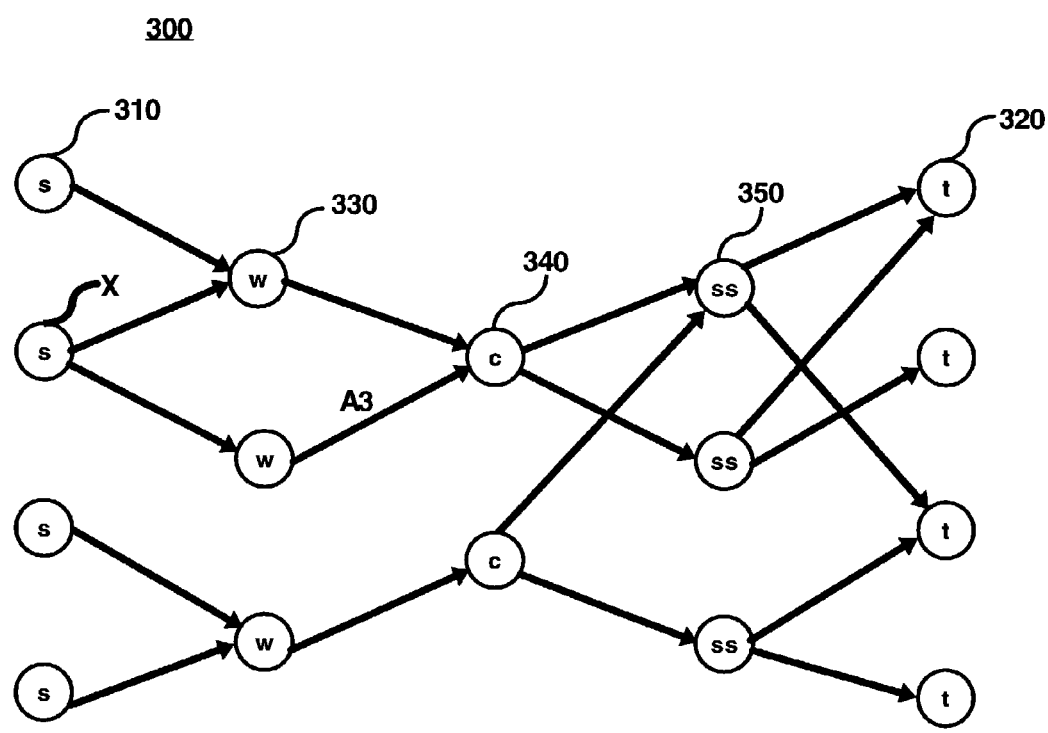
FIG. 3 is a block diagram of an exemplary graph illustrating the concept of global data placement in multi-commodity flow modeling approach according to an embodiment of the present invention.

The graph may be viewed as a layered network that includes sources, compute server nodes, storage nodes, and sinks as the layers. The multi-commodity flow graph may be enhanced with additional edges and nodes to accommodate additional constraints. FIG. 3 is a block diagram of an exemplary graph 300 illustrating this concept, which includes store source nodes 310 (denoted by "s"), store sink nodes 320 (denoted by "t"), workload nodes 330 (denoted by "w"), compute server nodes 340 (denoted by "c"), and storage server nodes 350 (denoted by "ss").

The edge capacity constraints may be used to enforce the constraints in the system. These could be, for example, the sum of computational requirements for workloads directed to a compute server may not exceed the total computational capacity of the compute server. As another example, the sum of storage requirements for a storage server may not exceed the storage capacity of the storage server.

Control Flows

In conventional flow formulations, flows may be split among different edges. For example, referring back to FIG. 3, the flow of commodity X may be split to the first and second workload nodes 330. While not shown, the flow from any of the workload nodes 230 may be split to flow to both of the compute notes 340. In addition, there is no standard way of grouping flows of multiple commodities together so that if one commodity flows on a edge then the rest of the commodities in the group also flow on the same edge.

There are situations in which it is desirable to keep the flow from splitting. While not exhaustive, the situations include: (1) mapping each workload to exactly one compute server node; (2) not exceeding a specified number of replicas per store; and (3) replicating write flow to a store to all replicas of that store. In an embodiment of the present invention, a concept of control commodities is introduced to keep the flows from splitting.

Figure 4:
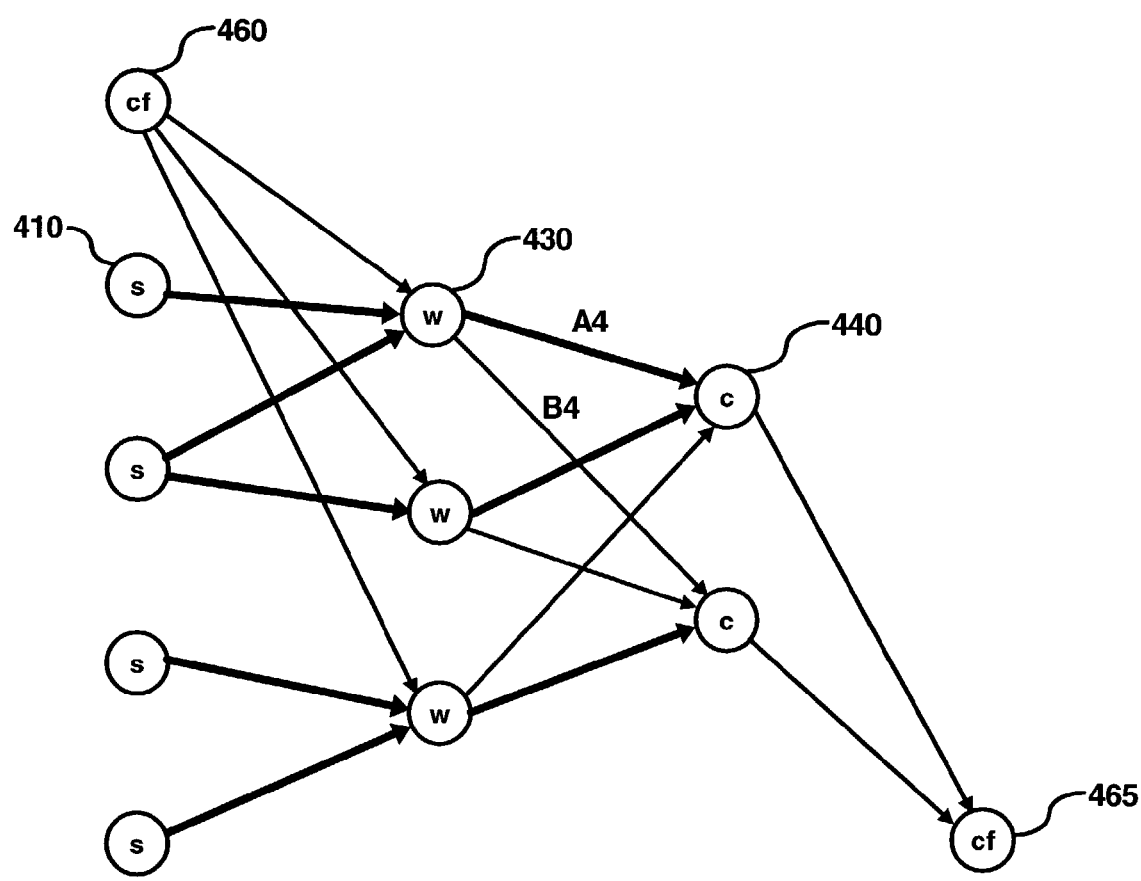
FIG. 4 is a block diagram of an exemplary graph illustrating use of control commodities according to an embodiment of the present invention.

A control commodity is a fictitious commodity used to enforce restriction on the flow of regular commodities. The control commodities may be used to select an edge among many in a network and channel all related flows along the chosen edge. FIG. 4 is a block diagram of an exemplary graph 400 illustrating the use of control commodities. As shown, the graph 400 includes store source nodes 410 (denoted by "s"), workload nodes 430 (denoted by "w"), and compute server nodes 440 (denoted by "c"). The graph 400 also includes a control commodity source 460 and sink 465 (both denoted by "cf"). The relatively thin lines indicate the control commodity flows and the relatively thick lines indicate other commodity flows.

The network is constructed such that when the control commodity flows on an edge, it consumes all the capacity of the edge. This may be done, for instance, by specifying that the control commodity flow is integral (0/1) and specifying the weight of that commodity on the edge to be equal to the capacity of the edge.

In an embodiment of the present invention, control commodities have zero cost associated with them. Thus, through the use of control commodities, the desired constraints are enforced without affecting the cost.

Allocating Resources on Compute Server Nodes

As noted above, in an embodiment of the multi-commodity flow approach, it is desired to map each workload to exactly one compute server node, i.e. direct all workload flow from a workload node to exactly one compute server node. For example, referring back to FIG. 4, it may be desired to have the entire workflow from the first workload node 430 (first from the top) go to the first compute server node 440 (again, first from the top) along an edge A4. The manner in which this may be enforced is as follows. Along the edge B4 (indicated by a relatively thin line connecting the top workload node 430 to the second compute server node 440), the control commodity flow on this edge is specified to consume the entire capacity of the edge. Because the edge B4 is entirely consumed by the control commodity flow, any other flow from the top workload node 430 must be on edge A4.

This may be generalized as follows. If there are n compute server nodes, a particular workload node may have n edges connecting that particular workload node with each of the n compute server nodes. In all but one of the edges (n–1 edges), a control flow may be specified to consume the entire capacity of each of the edges; this may be done by specifying the weight of the control flow to be equal to the capacity of the edge. Thus, the control flow may be used to block all but one of the edges (n–1 edges). Then only the remaining desired edge may carry the workflow commodity. This is repeated for each workload node to prevent splitting of flow of commodities from each workload node.

It is also desirable to ensure that the compute resource bounds of computation servers is not exceeded. Towards this end, a binary workload-cap flow may be defined for each workload. The binary workload-cap flow is 0/1 to indicate whether a workload is assigned to a compute server or not. This ensures that only the edges incident on all the compute server nodes carries this commodity.

Once the assignments are completed, whether the computation constraint of a compute server node is satisfied or not may be checked by adding up computation requirements for all the workloads assigned to the same compute server node. The same control commodity as above can be used to ensure that this commodity flows along with the other commodities of the corresponding workload.

As a result of the above use of control flow, the flow of a binary valued workload-cap commodity, $\tilde{y}_{ij}^k$ will be such that $\tilde{y}_{ij}^k$ is 1 if the store flows associated with that workload (aggregated over all the store commodities that the workload accesses) is non-zero, and $\tilde{y}_{ij}^k$ is 0 otherwise.

The workload-cap flow can now be used to enforce the constraint that the total compute capacity at the compute server is bounded. This is done by writing the edge constraint of equation (2) for the appropriate nodes as:

$$\sum_{k} \tilde{w}_{ij}^{k} \tilde{y}_{ij}^{k} \leq U_{c} \qquad (5)$$

where $\tilde{w}_{ij}^{k}$ represents the capacity required by the workload k and $U_c$ represents the total compute capacity of the server c. A similar setup can also be used to ensure that the total memory capacity at the compute server is not exceeded.

Figure 5:
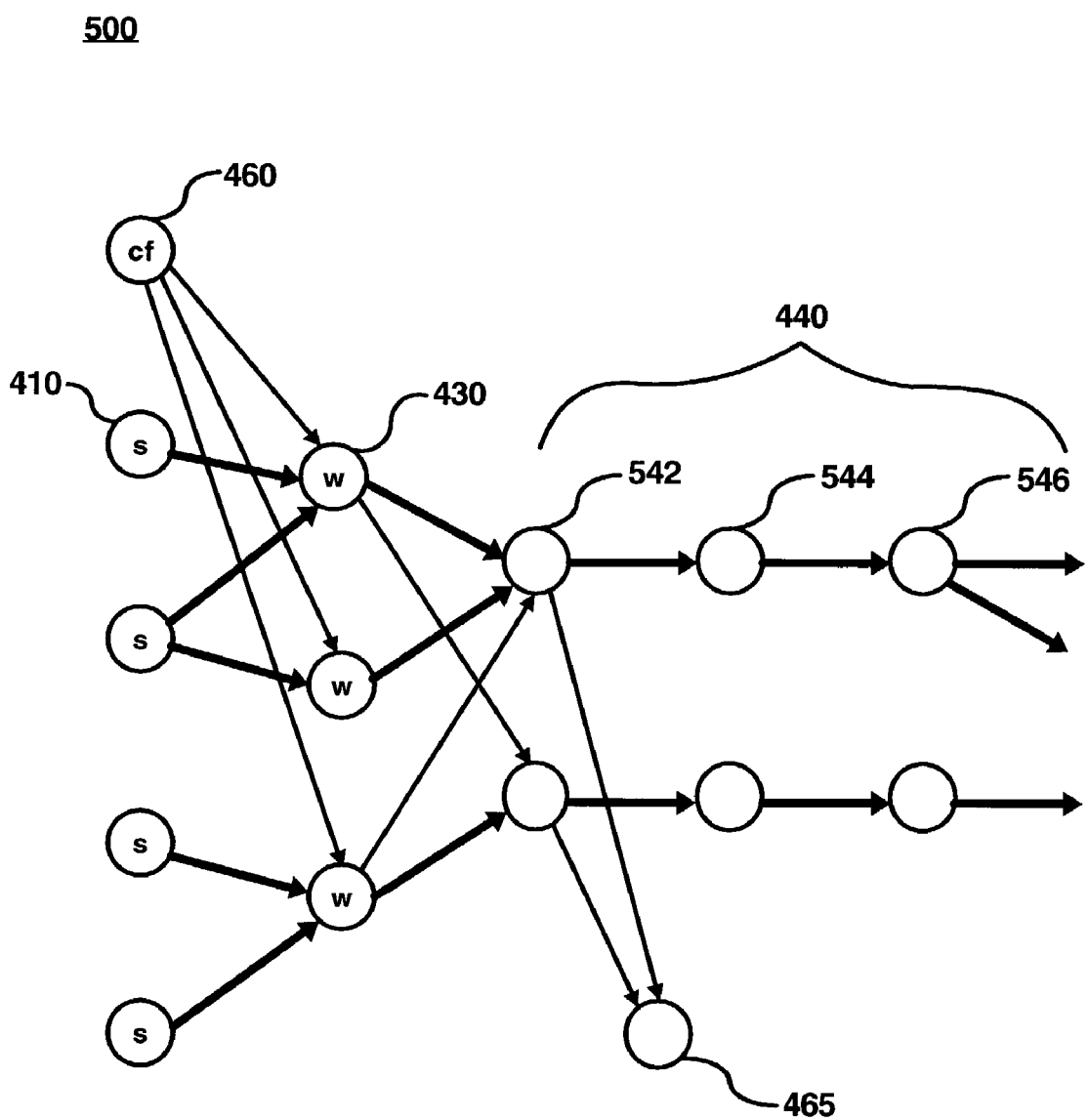
FIG. 5 is a block diagram of an exemplary graph illustrating modeling flow from workload to compute servers according to an embodiment of the present invention.

In an embodiment of the present invention, it may be desired to transform a multi-commodity network graph into another equivalent multi-commodity network graph. Certain transformations allow the constraints be defined in a manner that is easier to solve. FIG. 5 is a block diagram of an exemplary graph 500 illustrating modeling flow from workload to compute servers (storage servers are dealt with in FIG. 6). The graph 500 is much like graph 400 of FIG. 4 except that each compute server node 440 has been split into compute server nodes 542 (level 1), 544 (level 2) and 546 (level 3).

It should be noted that other number of levels are possible. In an embodiment of the present invention, from each workload node 430, only one first level compute server node 542 may be assigned through the use of the control flow from the control flow source 460.

Transforming the system in such a manner allows the multiple constraints specified originally on a node or an edge as a series of single constraints on the new edges. In this instance, it may be that the computation capacity constraint may be moved on the edges between nodes 542 and 544 (between levels 1 and 2) and the memory constraint may be moved on the edges between nodes 544 and 546 (between levels 2 and 3). This allows complex problems to be broken down to sub-problems and thus simplifying the computation. In addition, this allows the constraints to be expressed on the edges, which is typically required in order for the problem to be solved using multi-commodity flow algorithms.

Figure 6:
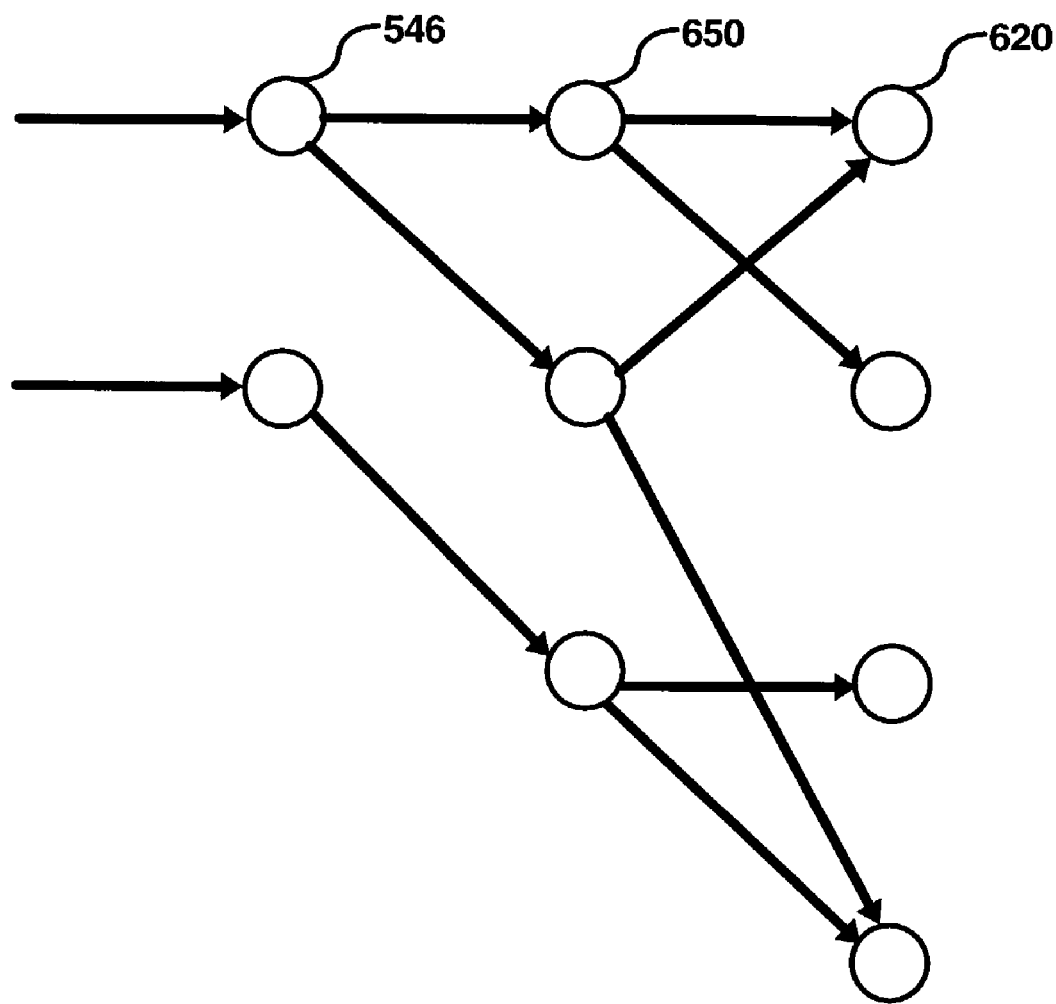
FIG. 6 is a block diagram of an exemplary graph illustrating modeling flow from compute servers to storage servers according to an embodiment of the present invention.

FIG. 6 is a block diagram of an exemplary graph 600 illustrating modeling flow from compute servers to storage servers according to an embodiment of the present invention. The graph 600 may be viewed as a continuation of the graph 500 of FIG. 5. Graph 600 may include compute server nodes 546 (like the third level nodes in FIG. 5), storage server nodes 650 and store sinks 620.

Allocating Resources on Storage Servers

Figure 7:
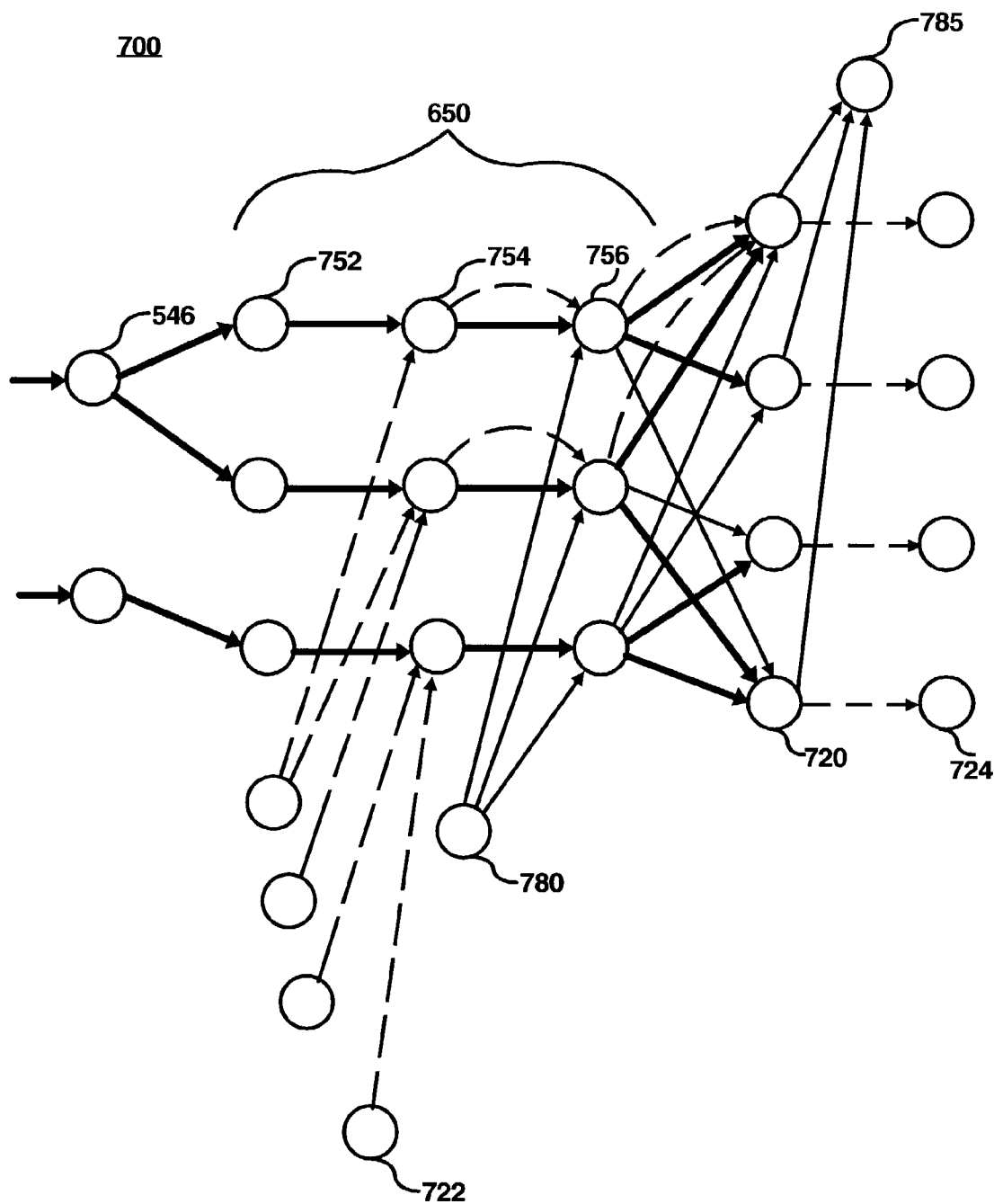
FIG. 7 is a block diagram of another exemplary graph illustrating modeling flow from compute servers to storage servers according to an embodiment of the present invention.

Like the compute server nodes, storage server nodes may also be split into multiple levels. This is shown in FIG. 7. As shown, each compute server 546 may have flows to one or more storage servers 650 (split into storage server nodes 752, 754, and 756), which in turn may have flows to one or more stores 720. Each store 720 may have a pre-defined, possibly different, number of replicas and each storage server 650 contains at most one replica of each store. For example, if a store 720 has m replicas, then m units of flow may be associated with the store-cap commodity 722 (described below) corresponding to the store 720. The control flow 750 may be defined to bind the m units of the store-cap flow and the stream for the store 720 together to exactly m storage servers 650. At most, one unit of store-cap flow may be allowed to flow to each storage server 650.

Similar to the situation with computation servers, it is desirable to ensure that the storage resource bounds of the storage servers is not exceeded. Towards this end, a binary store-cap flow may be defined for each store. The binary store-cap flow is 0/1 to indicate whether a replica is assigned to a storage server or not. Writing a constraint that uses all the store-cap flows, each multiplied with the corresponding store's size, will then enforce the constraint that the total storage capacity at the storage node is limited.

As a result of the above use of control flow, the flow of the binary valued store-cap commodity, $\tilde{z}_{ij}^{k}$ will be such that $\tilde{z}_{ij}^{k}$ is 1 if the store flow associated with that store is non-zero, and $\tilde{z}_{ij}^{k}$ is 0 otherwise.

The store-cap flow can now be used to enforce the constraint that the total storage capacity at the storage server is bounded. This is done by writing the edge constraint of equation (2) for the appropriate nodes as:

$$\sum_{k} \tilde{w}_{ij}^{k} \tilde{z}_{ij}^{k} \leq U_{s} \qquad (6)$$

where $\tilde{w}_{ij}^{k}$ represents the capacity required by the store k and $U_s$ represents the total storage capacity of the server s.

However, in graph 700, control flow is used in a manner different than illustrated in FIGS. 4 and 5. Here, the flow control from a flow control source 780 may be used to block an edge from one of the storage server nodes 756 to a store 720. In this way, the number of replicas may be controlled. For example, if the number of storage nodes is n and the number of replicas to place is r, then by ensuring that n-r units of control flow originates from the storage nodes, (n-r) edges may be blocked to guarantee that the number of replicas is only r. This also ensures that there is no more than one replica of a store on the same storage node.

Reads and Writes

Reads and writes may be handled differently. In the case of reads, it may be acceptable for a workload to get its data from more than one replica, and possibly getting the data at different rates from different replicas. In the case of writes, it may be necessary to send every write to every replica, indicating that the workload may generate the same write rate to each replica. In an embodiment of the present invention, control flows may also be used to enforce these requirements of reads and writes.

In the case of reads, the entire store may be represented by one commodity; not one commodity per replica. If the sum total of the read rates from all the workloads for a particular store is R, then it may be sufficient that the workloads be drawn, in any proportion, from any of the r replicas for that store to total R.

Each store may have a pre-determined number of replicas, which may be different for different stores. In other words, if $r_x$ represents the number of replicas for a store $s_x$, $r_x$ is not determined as a solution to the GDP problem. Rather, $r_x$ is provided as an input. In an embodiment of the present invention, the solution to the GDP problem is such that if any flow rate is drawn from a particular storage node, a replica is guaranteed to be located at the storage node, i.e., there is storage space allocated there for that replica. In addition, it is ensured that there is only one replica per store at a storage node.

For each store that a workload reads from, a flow, corresponding to the rate at which the workload accesses that store, is constructed. All such flows, from the stores that the workload reads, are made to flow to the same computation node using the control-flow that was used to assign the workload to exactly one computation node. This is used to ensure that all the read traffic that the workloads assigned to a computation node generate, all originate from the same computation node.

On the storage server side, it may not be necessary to distinguish the individual flows to the same store from different workloads: they are all for the same commodity. Also, it may not be necessary to group multiple stores accessed by the same commodity, as done in the compute server side. This ensures that a) that the stores accessed by one workload may be located at different storage servers, and b) the data from one store that one workload accesses may be derived piecemeal from the different replicas of that store.

As discussed before, by using a control-flow it is ensured there are only the predefined number of replicas of a particular store. The same control-flow can also be used to ensure that there is flow for a particular store (corresponding to the reads generated by workloads) only if there is a replica located at that storage node.

In case of writes, the write load generated by a workload to a particular store may need to go to each of its replicas so that all replicas of a store are consistent. Thus, for writes, a commodity may be defined corresponding to each replica of a store. Thus, if a store has r replicas, then there are r commodities for that store. Note that the number of these commodities is independent of the number of workloads, and only depends on the number of replicas of that store. In this instance, if a workload generates a write load of w units, then w units of each of the r kinds of commodities flow along with the commodities that correspond to the reads of that workload. In this manner, if a workload is assigned to a computation node, all the read and write traffic that the workload generates appear to originate from the same computation node (the one where the workload is assigned to).

Now at the storage nodes, the following should be ensured: a) all the write flow to a particular replica ends up at the storage node where the replica is located, and b) there are no more than one replica of a store on the same node. This may be accomplished by first ensuring that, at a storage node, there is write flow for a particular store only if there is a replica located there: this is done using the same control flow which was used to ensure that the reads went to only nodes where the store was located. Then it may be ensured that for each store, the total write flow at each storage node is at most W, where W is the sum total of the write traffic generated by all the workloads to that store: this is done using a simple constraint on the incoming edge to the storage node. Then it may be ensured that all the write flow for a particular replica ends up at exactly one storage node: this is ensured using another control-flow in a manner similar to that was used to ensure that all the workload was assigned to exactly one compute server node.

Solving GDP

Once the GDP problems are modeled using the multi-commodity flow approach, very good algorithms may be utilized to solve the problems. For example, branch and bound algorithms may be used. Approximation algorithms, such as randomized rounding and integer packing, may be used as well. The multi-commodity flow approach to modeling and solving GDP problems allows provable quality solutions to be achieved.

The terms and descriptions used herein are set forth by way of illustration only and are not meant as limitations. Those skilled in the art will recognize that these and many other variations are possible within the spirit and scope of the invention as defined in the following claims, and their equivalents, in which all terms are to be understood in their broadest sense unless otherwise indicated.

What is claimed is:

1. A method of global data placement, comprising:
    modeling placement of data in a global system of nodes as a multi-commodity network flow problem, wherein costs are associated with the placement of data;
    determining a solution to the network flow problem that minimizes the aggregate costs associated with the placement of data in the global system; and
    placing the data in the global system of nodes according to the determined solution.

2. The method of claim 1, wherein placing the data further comprises:
    assigning one or more workloads to one or more compute servers;
    controlling flow of the one or more workloads wherein each workload flows to one compute server; and
    connecting the one or more compute servers to one or more storage servers.

3. The method of claim 2, further comprising assigning data replicas to each of the one or more storage servers.

4. The method of claim 3, wherein the step of controlling flow comprises specifying edges connecting each workflow to all compute servers such that all but one edge is passed by a control flow, wherein the flow control is specified to consume a total capacity of the edge the flow control passes.

5. A method of global data placement, comprising:
    assigning one or more workload nodes such that each of one or more workloads is connected to at least one of the one or more workload nodes;
    assigning one or more compute server nodes connected to the one or more workload nodes such that a workflow from each workload node passes through an edge to a single compute server node;
    assigning one or more storage server nodes such that each compute server node is connected to at least one of the one or more storage server nodes; and
    assigning one or more store nodes such that each of one or more storage server nodes is connected to at least one of the one or more store nodes; and
    placing data in global system comprising the one or more workload nodes, the one or more compute server nodes, the one or more storage server nodes, and the one or more store nodes according to their assigned connections with respect to each other.

6. The method of claim 5, further comprising:
    assigning a commodity to each workload such that a store is connected to at least one of the one or more workload nodes; and
    assigning a commodity to each store such that each store is connected to at least one of the one or more store nodes.

7. The method of claim 6, further comprising minimizing cost of global data placement subject to constraints, wherein constraints include at least one of flow conservation for each node, edge capacity constraint for each edge, and individual commodity constraints.

8. The method of claim 7, wherein:
    the flow conservation is defined as $$\sum_j x_{ij}^k - \sum_j x_{ji}^k = 0 \text{ where } \sum_j x_{ij}^k$$

represents the sum of outgoing flow of a commodity k from node i and $$\sum_j x_{ji}^k$$

represents the sum of incoming flow of the commodity k into node i;

the edge constraint is defined as $$\sum_k w_{ij}^k x_{ij}^k \leq U_{ij}$$

where $w_{ij}^k$ represents a weight of the commodity k flowing through edge from node i to node j (or edge ij), $x_{ij}^k$ represents the amount flow of commodity k through the edge ij, and $U_{ij}$ represents the upper limit on capacity of the edge ij; and individual commodity constraint is defined as $l^{ijk} \leq x_{ij}^k \leq u_{ij}^k$ where $l_{ij}^k$ and $u_{ij}^k$ represent lower and upper bounds on the capacity of the commodity k through the edge ij.

9. The method of claim 8, wherein at least one of the following occurs:

the edge constraint is defined as $$\sum_k \tilde{w}_{ij}^k \tilde{z}_{ij}^k \leq U_s$$

where $\tilde{z}_{ij}^k$ will be such that $\tilde{z}_{ij}^k$ is 1 if the store flow associated with that store is non-zero, and $\tilde{z}_{ij}^k$ is 0 otherwise, and $\tilde{w}_{ij}^k$ represents the capacity required by the store k, and $U_s$ is the total storage capacity of the one or more storage server; and the edge constraint is defined as $$\sum_k \tilde{w}_{ij}^k \tilde{y}_{ij}^k \leq U_c.$$

where $\tilde{y}_{ij}^k$ will be such that $\tilde{y}_{ij}^k$ is 1 if the store flows associated with that workload (aggregated over all the store commodities that the workload accesses) is non-zero, and $\tilde{y}^{ijk}$ is 0 otherwise, and $\tilde{w}_{ij}^k$ represents the capacity required by the store k, and $U_c$ is the total computing capacity of the one or more compute server.

10. The method of claim 8, wherein minimizing cost is defined as solving $\min(\Sigma_k \Sigma_{ij} C_{ij}^k x_{ij}^k)$ where $C_{ij}^k$ represents a cost of flow of the commodity k through edge ij.

11. The method of claim 7, wherein one or more of the compute server nodes are split into at least a first, second and third levels defining two edges, the first edge being between first and second levels of nodes and the second edge being between the second and third levels of nodes, wherein one of the first and second edges includes a computation capacity constraint and the other of the first and second edges includes a memory capacity constraint.

12. The method of claim 11, wherein the flow from each workload node passes through an edge to a single first level compute server node.

13. The method of claim 7, wherein one or more of the storage server nodes are split into at least a first, second and third levels defining two edges, the first edge being between first and second levels of nodes and the second edge being between the second and third levels of nodes, wherein one of the first and second edges includes a bandwidth capacity constraint and the other of the first and second edges includes a storage capacity constraint.

14. The method of claim 7, further comprising using at least one of branch and bound algorithm, randomized rounding algorithm, and integer packing algorithm.

15. The method of claim 6, wherein a store may have one or more replicas.

16. The method of claim 15, wherein a particular storage store includes at most only one replica per node.

17. The method of claim 16, further comprising at least one of:

defining a binary store-cap flow associated with each store wherein values of the binary store-cap flow on an edge between the storage server node and store node is 0/1 to indicate whether or not a replica for a particular store may be stored on the storage server; and defining a binary workload-cap flow for a workload wherein values of the binary store-cap flow is 0/1 to indicate whether or not the workload is assigned to a particular compute server.

18. The method of claim 15, further comprising:

generating a read commodity for a store to be read; and generating one or more read workflows for the read commodity such that a sum of reads from one or more replicas of the store to be read sums to a required read total.

19. The method of claim 15, further comprising:

generating a write commodity for each replica of a store to be written;

generating one or more write workflows for each write commodity such that each replica of the write store are updated.

20. A method of allocating resources in a network, comprising:

modeling a source and a sink for each data stream of the network;

modeling intermediate nodes including one or more workload nodes, one or more compute server nodes, and one or more storage server nodes such that each workload node is connected to only one of the one or more compute server nodes and such that each compute server node is connected to at least one of the one or more storage server nodes;

connecting the source for each data stream to at least one of the one or more workload nodes; and connecting the source for each data stream to at least one of the one or more storage server nodes.

21. The method of claim 20, further comprising:

modeling a source and a sink for control flows such that the source for control flows is connected to each workload node;

modeling, for each workload node, such that a control flow connection is established between the workload node and all but one compute server nodes; and specifying that the control flow connection consumes a full edge capacity.

22. The method of claim 21, wherein cost of the model is minimized subject to constraints, wherein constraints include flow conservation through each of the intermediate nodes.

23. The method of claim 22, wherein the cost of control flows is zero.

24. The method of claim 23, wherein constraints further include edge capacity constraints between nodes.

25. The method of claim 24, wherein edge capacity constraints include:
- at least one of a computation capacity constraint and a memory capacity constraint for an edge leading to a compute server node; and
- at least one of a storage capacity constraint and a bandwidth constraint for an edge leading to a storage server node.

26. The method of claim 25, wherein at least one of the following occurs:
- one or more of the compute server nodes are split into at least a first, second and third levels defining two edges, the first edge being between first and second levels of nodes and the second edge being between the second and third levels of nodes, wherein an edge constraint of one of the first and second edges is the computation capacity constraint and edge constraint of the other of the first and second edges is the memory capacity constraint; and
- one or more of the storage server nodes are split into at least a first, second and third levels defining two edges, the first edge being between first and second levels of nodes and the second edge being between the second and third levels of nodes, wherein an edge constraint of one of the first and second edges is the storage capacity constraint and edge constraint of the other of the first and second edges is the bandwidth constraint.

27. The method of claim 26, wherein each workload node is connected through an edge to a single first level compute server node.

28. The method of claim 27, wherein each storage server node is connected through an edge to a last level compute server node.

* * * * *

UNITED STATES PATENT AND TRADEMARK OFFICE
CERTIFICATE OF CORRECTION

PATENT NO. : 7,225,118 B2  Page 1 of 1
APPLICATION NO. : 10/284098
DATED : May 29, 2007
INVENTOR(S) : Qian Wang et al.

It is certified that error appears in the above-identified patent and that said Letters Patent is hereby corrected as shown below:

In column 10, line 43, in Claim 5, after "data in" insert -- a --.

Signed and Sealed this

Nineteenth Day of May, 2009

JOHN DOLL
*Acting Director of the United States Patent and Trademark Office*